US012676564B2

(12) United States Patent
Schnappauf

(10) Patent No.: US 12,676,564 B2
(45) Date of Patent: Jul. 7, 2026

(54) METHOD AND CONTROL DEVICE FOR OPERATING A ROADBOUND ALL-WHEEL VEHICLE

(71) Applicant: Bayerische Motoren Werke Aktiengesellschaft, Munich (DE)

(72) Inventor: Florian Schnappauf, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 85 days.

(21) Appl. No.: 18/272,280

(22) PCT Filed: Feb. 10, 2022

(86) PCT No.: PCT/EP2022/053186
§ 371 (c)(1),
(2) Date: Jul. 13, 2023

(87) PCT Pub. No.: WO2022/184398
PCT Pub. Date: Sep. 9, 2022

(65) Prior Publication Data
US 2024/0079975 A1 Mar. 7, 2024

(30) Foreign Application Priority Data
Mar. 5, 2021 (DE) ..................... 10 2021 105 341.2

(51) Int. Cl.
*H02P 1/02* (2006.01)
*B60K 17/356* (2006.01)
(Continued)

(52) U.S. Cl.
CPC .............. *H02P 5/50* (2013.01); *B60K 17/356* (2013.01); *B60K 23/0808* (2013.01);
(Continued)

(58) Field of Classification Search
CPC ...... H02P 5/50; B60K 17/356; B60K 23/0808
(Continued)

(56) References Cited

U.S. PATENT DOCUMENTS

2004/0204286 A1* 10/2004 Stridsberg .............. B60K 6/547
475/5
2011/0004363 A1* 1/2011 Severinsky ........... B60W 10/06
62/239
(Continued)

FOREIGN PATENT DOCUMENTS

CN 104163106 A 11/2014
CN 104442806 A 3/2015
(Continued)

OTHER PUBLICATIONS

International Search Report (PCT/ISA/210) issued in PCT Application No. PCT/EP2022/053186 dated Jun. 1, 2022 with English translation (4 pages).
(Continued)

*Primary Examiner* — Erick D Glass
(74) *Attorney, Agent, or Firm* — Crowell & Moring LLP

(57) ABSTRACT
A control device for operating a roadbound all-wheel vehicle having a first electric drive motor assigned to a primary axle and a second electric drive motor assigned to a secondary axle, including a control unit configured such that, when a defined dynamic driving mode of the driver is identified based on the driver request gradient during a operating mode with the first motor activated and the second motor deactivated for a predefined time window, an overall setpoint moment characteristic predefined by a new driver request is ascertained. This is set, in accordance with an axle distribution factor that is likewise predefined, by reducing the setpoint moment of the primary motor and by activating and increasing the setpoint moment of the secondary motor, even when the predefined overall setpoint moment characteristic
(Continued)

lies below a maximum possible moment of the primary motor.

12 Claims, 5 Drawing Sheets

(51) Int. Cl.

| | | |
|---|---|---|
| *B60K 23/08* | (2006.01) | |
| *B60L 15/20* | (2006.01) | |
| *H02P 5/50* | (2016.01) | |

(52) U.S. Cl.
CPC ...... *B60L 15/20* (2013.01); *B60K 2023/0816* (2013.01); *B60L 2220/42* (2013.01); *B60L 2240/423* (2013.01); *B60L 2260/24* (2013.01); *B60L 2260/28* (2013.01)

(58) Field of Classification Search
USPC .......................................................... 318/41
See application file for complete search history.

(56) References Cited

U.S. PATENT DOCUMENTS

| | | | |
|---|---|---|---|
| 2014/0343774 | A1 | 11/2014 | Wimmer et al. |
| 2015/0088356 | A1 | 3/2015 | Sailer et al. |
| 2018/0312081 | A1 | 11/2018 | Hancock et al. |
| 2018/0370385 | A1 | 12/2018 | Strasser |
| 2020/0055409 | A1 | 2/2020 | Yao et al. |

FOREIGN PATENT DOCUMENTS

| | | | |
|---|---|---|---|
| CN | 108116269 | A | 6/2018 |
| CN | 108569168 | A | 9/2018 |
| DE | 10 2012 211 920 | A1 | 1/2014 |
| DE | 10 2013 219 085 | A1 | 3/2015 |
| DE | 10 2014 200 427 | A1 | 7/2015 |
| DE | 10 2015 015 697 | A1 | 6/2017 |
| DE | 11 2016 005 383 | T5 | 8/2018 |
| EP | 3 546 274 | A1 | 10/2019 |
| EP | 3 708 407 | A1 | 9/2020 |
| FR | 2 911 568 | A1 | 7/2008 |

OTHER PUBLICATIONS

German-language Written Opinion (PCT/ISA/237) issued in PCT Application No. PCT/EP2022/053186 dated Jun. 1, 2022 (6 pages).

German-language Search Report issued in German Application No. 10 2021 105 341.2 dated Feb. 16, 2022 with partial English translation (11 pages).

Chinese-language Office Action issued in Chinese Application No. 202280007643.1 dated Aug. 19, 2025, with English translation (16 pages).

Chinese-language Office Action issued in Chinese Application No. 202280007643.1 dated Mar. 27, 2026 with English translation (14 pages).

* cited by examiner

METHOD AND CONTROL DEVICE FOR OPERATING A ROADBOUND ALL-WHEEL VEHICLE

FIELD

The invention relates to a method and a control device for operating a roadbound all-wheel drive vehicle having at least one electronic control unit, having a first electric drive motor assigned to a primary axle (for example, rear axle) and having a second electric drive motor assigned to a secondary axle (for example, front axle).

BACKGROUND AND SUMMARY

For example, DE 10 2014 200 427 A1 makes known a roadbound hybrid vehicle that includes two different drive units on the particular axle. The different drive units, more particularly an internal combustion engine and an electric drive motor, have different dynamic properties; i.e., the target torques are not providable equally quickly at the individual axles. More particularly, an increase in torque can be carried out considerably faster by means of an electric drive motor than the same torque increase can be carried out by means of an internal combustion engine. The electronic control unit known from DE 10 2014 200 427 A1 deals more particularly with problems of these different drive units.

In a so-called roadbound all-wheel drive vehicle, the primary motor and the secondary motor are not drivingly coupled via a clutch, but rather via the wheels by means of the road. Such roadbound all-wheel drive vehicles are also referred to as "axle-split" vehicles. Such all-wheel drive vehicles are usually operated in a first operating mode (preferably an efficiency-optimized drive mode) solely with the primary motor and are also operable as an all-wheel drive vehicle using both drive motors in a second operating mode (preferably a performance-optimized drive mode), in which the secondary motor is automatically switchable on and off.

In the following, the "electric drive motor" is also referred to in short as an "electric motor," and the "drive torque" is also referred to in short as "torque."

One problem addressed by the invention is that of improving an all-wheel drive vehicle of the aforementioned type with respect to performance, efficiency, and comfort.

This problem is solved according to the invention by the subjects of the independent claims. Dependent claims are advantageous enhanced embodiments of the invention.

The application deals with different strategies for automatically switching the electric secondary motor on and off when a likewise electric primary motor is present. In the related art, driving stability-oriented travel with distribution of drive torque onto the axles for increasing traction is usually emphasized.

The present invention relates to a control device for operating a roadbound all-wheel drive vehicle having at least one electronic control unit, having a first electric drive motor (primary motor) assigned to a primary axle and having a second electric drive motor (secondary motor) assigned to a secondary axle. The control unit includes a dynamic function module designed such that, when a defined dynamic driving mode of the driver is identified on the basis of the driver-input gradient during a (single-axle) operating mode with the primary motor activated and the secondary motor deactivated for a predefined time window, a total target torque curve predefined by the new driver input is ascertained. The total target torque curve is set, in accordance with an axle distribution factor that is likewise predefined, by reducing the target torque of the primary motor and by activating and increasing the target torque of the secondary motor, even when the predefined total target torque curve is below a maximum possible torque of the primary motor.

The control unit is preferably also designed such that, when activation of the secondary motor is required starting from a switched-off magnetic field of the secondary motor, the required magnetization time is predetermined as a predefined delay time. The primary motor solely provides the required total target torque for the duration of this delay time. Only then are the target torques of both electric drive motors synchronously set in accordance with a predefined all-wheel distribution factor.

The switching-on of the magnetic field of the secondary motor and, thereby, the delay time are started, for example, upon detection of a changeover from coasting to traction on the basis of the driver input. Additionally or alternatively, the switching-on of the magnetic field of the secondary motor and, thereby, the delay time can be started upon detection of an increased load on the primary motor.

A defined dynamic driving mode of the driver is preferably identified on the basis of the driver-input gradient when the current driver-input gradient exceeds a predefined threshold value.

The predefined total target torque curve is preferably determined depending on the driver-input gradient and depending on the difference between the target torque predefined by the driver input and the currently available torque of the primary motor.

The invention is based on the following considerations:

The basic idea is an all-wheel driving strategy with respect to unsteady processes for electrified vehicles having two electric drive motors, namely a first electric (drive) motor on a primary axle and a second electric (drive) motor for a secondary axle.

For reasons of efficiency, it can be meaningful in the case of electrified all-wheel drive vehicles to travel for as long as possible in the single-axle mode (rear-wheel drive or front-wheel drive). The axle driven in the preferably single-axle mode is referred to as the primary axle.

In a dynamic ("unsteady") driving mode, it is meaningful for reasons of performance to engage the second axle (secondary axle) early in order to generate a sporty performance response (also referred to as "response" or "punch") of the vehicle. A dynamic driving mode is detected more particularly on the basis of a steep gradient of the accelerator pedal actuation (also referred to as "tip in").

The individual drive axles (primary axle with primary motor and secondary axle with secondary motor) are coupled only by means of appropriate software in at least one electronic drive control unit. A coupling via a longitudinal clutch in a transfer gearbox as in conventional all-wheel drive vehicles is not present.

Since each of the drive axles is drivable by at least one electric motor, the drive axles can be de-energized by switching off the magnetic field (in the case of externally excited electric motors) when the drive axles cannot be decoupled from the drive by means of clutches. In the present invention, such clutches are preferably to be dispensed with for cost-related reasons.

A delayed coupling of the secondary axle or a delayed magnetic field excitation of the secondary motor and, thereby, a (too) late all-wheel drive activation causes uncomfortable jolts during tip-in processes, a delay in setting the target torque, drops in tractive force and/or excessively high torque gradients at the drive axles.

The control device according to the invention includes an electronic control unit, which, on the basis of a tip-in detection, calculates and specifies a defined all-wheel distribution in the form of an axle distribution factor. The tip-in detection preferably takes place due to a threshold value of the applied driver-input gradient having been exceeded and preferably on the basis of the difference between the driver input and the currently available torque of the primary drive unit; i.e., in other words, when the acceleration of the actuation of the accelerator pedal (or of another driver-input operating element) is greater than a predefined first threshold value and when, preferably, the difference between the actual torque of the primary motor and the target torque of the primary motor predefined by the new driver input is greater than a predefined second threshold value. On the basis thereof, an all-wheel drive activation or an activation of the secondary motor can be implemented early.

Once a tip-in has been detected, according to the invention, a certain time window is started, within which the total target torque curve (height and gradient) predefined by the new driver input is ascertained and set at both axles by the two electric motors by means of a predefined axle distribution factor. The target torque of the primary motor is decreased and the target torque of the secondary motor is increased.

Preferably, the magnetic field of the secondary motor is switched off in the coasting condition. If a changeover from coasting to traction is detected within the scope of the tip-in detection, the magnetic field must first be excited (again) starting from a switched-off magnetic field, before the torque can be increased. This yields a delay time prior to the increase of the target torque of the secondary motor.

In a first alternative, the target torque of the secondary motor can initially be temporarily compensated for by appropriately increasing the target torque of the primary motor, provided that the target torque of the primary motor would as a result still be below the maximum possible torque of the primary motor.

In a second, more advantageous alternative, however, the increase of the total target torque is delayed overall by the delay time (magnitude 30 ms) required for the magnetic field excitation. The inventors have recognized that this delay time is unnoticeable to (not "comprehensible by") the driver. Therefore, the target torques of the two axles can be synchronously increased, as a result of which the comfort is even further increased.

Due to the invention, for example, the following method sequence can be predefined:

1. Calculate the maximum settable torque per axle depending on operating parameters, such as, for example, temperature or slip.
2. Check whether the total target torque requested by the driver is less than the maximum settable torque of the primary axle.
3. Calculate the gradient of an increase in the driver input and the difference (also referred to as "delta" or "off-set") between the torque corresponding to the driver input present prior to the increase and the torque corresponding to the driver input present after the increase.
4. Calculate the all-wheel distribution factor depending on the result from 3. under consideration of the maximum settable torques of the two axles.
5. Calculate a dynamic function, by means of which a total target torque curve (offset and gradient depending on the previously ascertained increase in the driver input) for a predefined time window is settable by the electric motors of both axles.
6. Detect a changeover from coasting to traction and vice versa.
7. Calculate an all-wheel distribution factor as a function of predefined conditions, for example, depending on the load condition of the primary motor.
8. Check the exceedances of the threshold value in order to activate a coupling and excitation of the secondary motor in an anticipatory manner, and to implement the predefined all-wheel distribution factor.

Due to the invention, the setting of the total torque no longer solely has the highest priority. Rather, the optimal distribution of the axle torques is also taken into account with respect to efficiency, performance and comfort.

Details of the invention are explained in greater detail in the following exemplary embodiments on the basis of the drawings.

DETAILED DESCRIPTION

Figure 1:
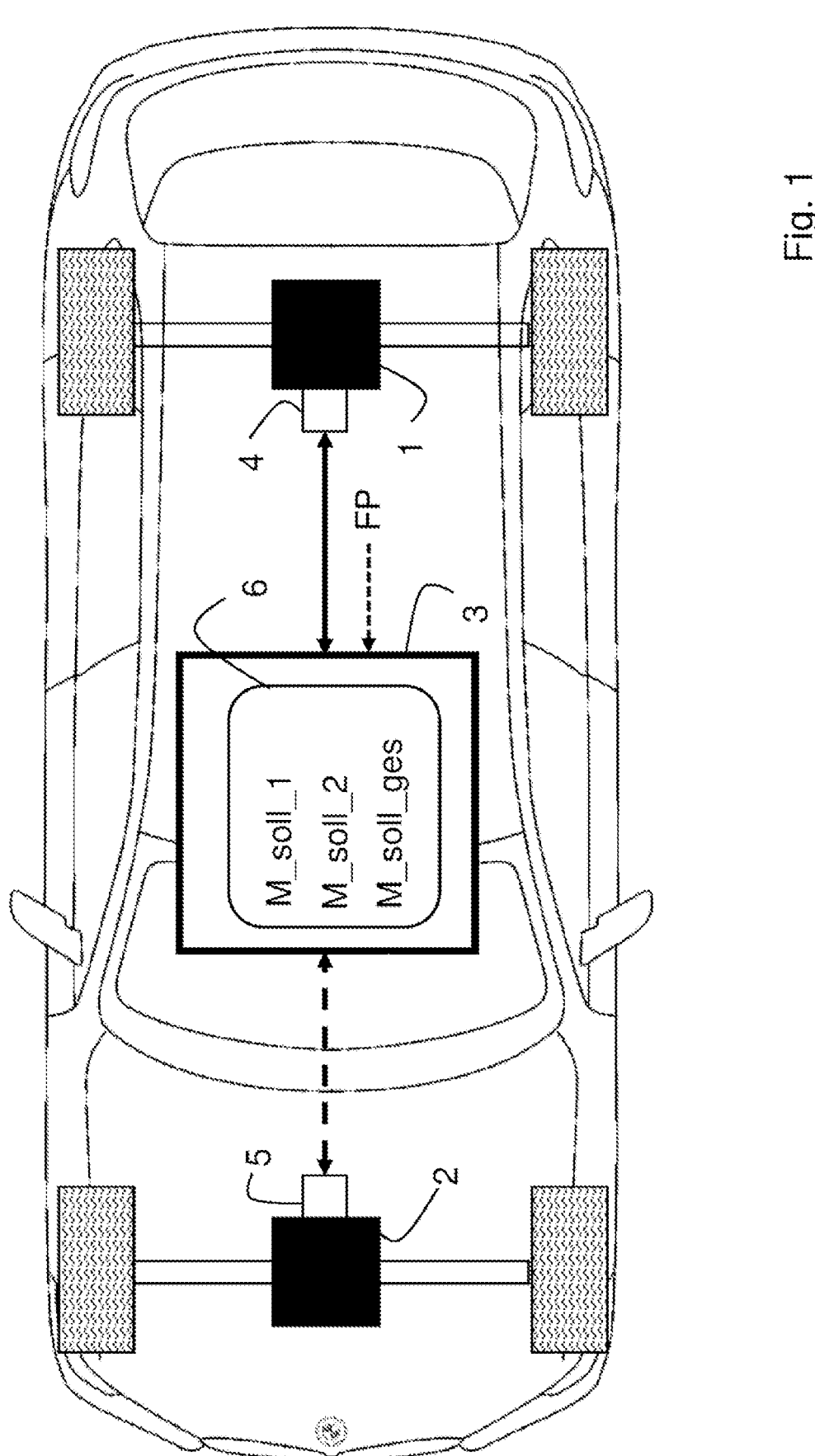
FIG. 1 shows a schematic representation of a roadbound electric all-wheel drive vehicle according to the invention including components that are essential to the dynamic function according to the invention.

FIG. 1 shows a so-called roadbound all-wheel drive vehicle having a first electric motor 1 as a primary motor, which acts as a drive motor, for example, on the rear axle, and having a second electric motor 2 as a secondary motor, which acts as a drive motor on the front axle. The primary motor 1 can include a separate mechatronically connected sub-control unit 4 and the secondary motor 2 can include a separate mechatronically connected sub-control unit 5. Both sub-control units 4 and 5 are connected to a central electronic control unit 3.

A method for controlling the operation of the electric all-wheel drive vehicle is carried out by the central electronic control unit 3, which includes appropriate programmable function modules and connections to the required sensors, actuators and/or to the sub-control units 4 and 5. According to the present disclosure, a dynamic function module 6 is included in the control unit 3, for example, in the form of a software program (computer program product), the design and mode of operation of which is discussed in greater detail in the description of FIGS. 2 through 5.

Figure 2:
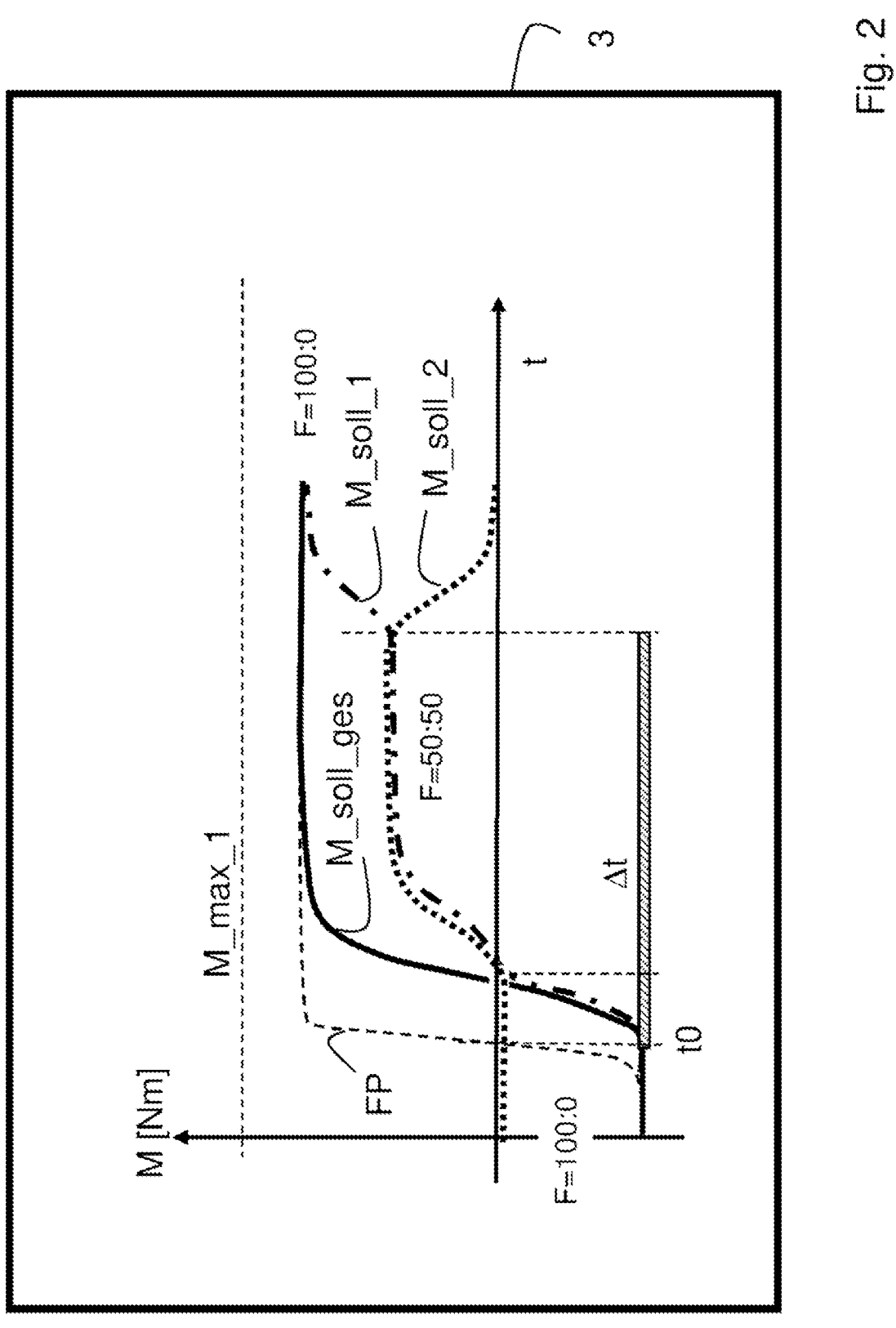
FIG. 2 shows a diagram-type representation of the basic idea of the control device according to the invention.

FIG. 2 shows, representatively for FIGS. 2 through 5, a diagram with the time t plotted on the x-axis and the torque M plotted on the y-axis. The driver input in the form of an accelerator pedal position FP is characterized as a dashed line, the total target torque curve M_soll_ges ascertained from the driver input FP via an interpretation of the accelerator pedal is characterized as a solid line, the target torque M_soll_1 of the primary motor 1 is characterized as a dash-dotted line, and the target torque M_soll_2 of the secondary motor 2 is characterized as a dotted line. The maximum torque that can be provided by the primary motor 1 is designated as M_max_1.

The diagram according to FIG. 2 initially shows a coasting operation having an all-wheel distribution factor of F=100:0 at a negative torque M_soll_1. The torque M_soll_2 is zero, since the secondary motor 2 is initially shut off.

At the point in time t0, dynamic driver input (tip-in situation) is detected on the basis of the steep gradients of the accelerator pedal position FP. The dynamic function 6 according to the present disclosure starts with the specification of a time window Δt. According to the present disclosure, within the time window Δt, the total target torque curve M_soll_ges (height and gradient) predefined by the new driver input FP is ascertained and provided at both axles by the two electric motors 1 and 2 by means of a predefined axle distribution factor F, which is 50:50 in this case. The target torque M_soll_1 of the primary motor is decreased and the target torque M_soll_2 of the secondary motor 2 is increased. At the end of the time window Δt, the secondary motor 2 is comfortably switched off again, and the primary motor 1 once again provides the total target torque M_soll_ges, which is still requested via the driver input FP.

Figure 3:
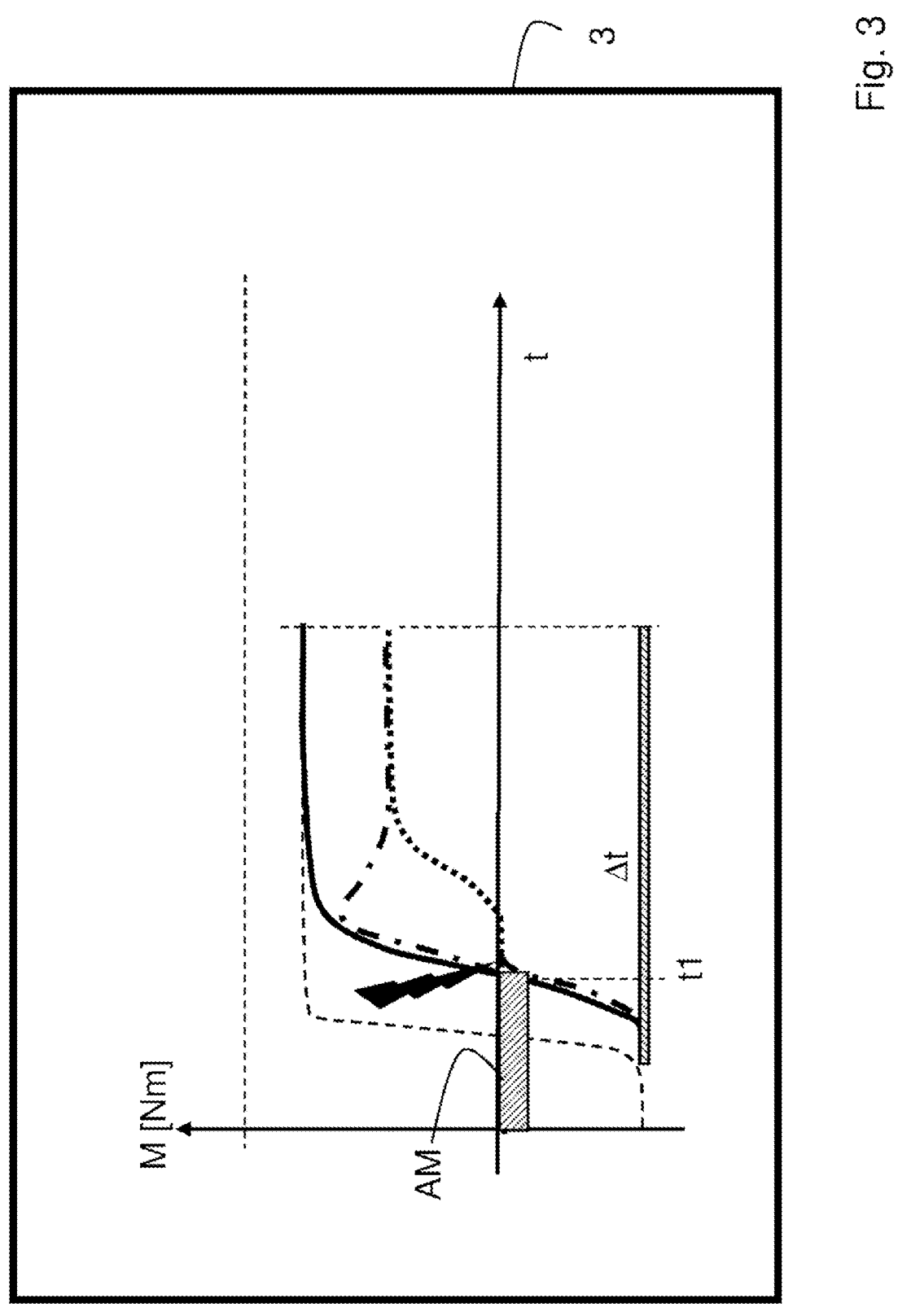
FIG. 3 shows a diagram-type representation of the problem by way of the de-energization of the magnetic field of the secondary motor, for example, in the coasting condition.
Figure 4:
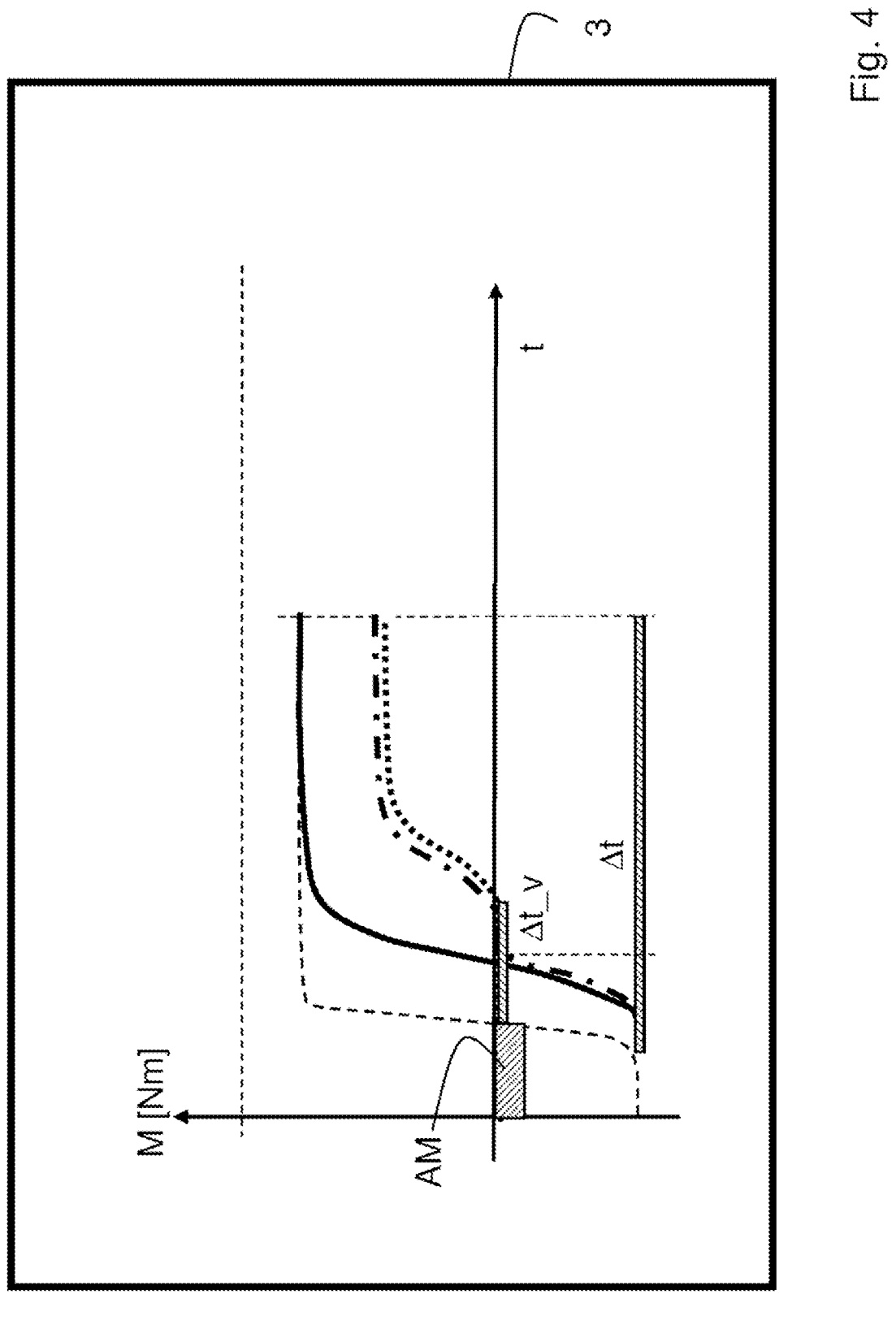
FIG. 4 shows a diagram-type representation of a first solution to the problem represented in FIG. 3.

FIG. 3 deals with the problems of decoupling the secondary motor 2 by means of a magnetic field shutoff AM in the coasting condition. If a changeover from coasting to traction is detected here within the scope of the tip-in detection at the point in time t1, the magnetic field must first be excited (again) starting from a switched-off magnetic field, before the torque M_soll_2 of the secondary motor 2 can be increased. As shown in FIG. 4, this yields a delay time Δt_v prior to the increase of the target torque M_soll_2 of the secondary motor 2.

In an advantageous enhanced embodiment of the present disclosure represented in FIG. 4, the increase of the total target torque M_soll_ges overall is delayed by the delay time Δt_v required for the magnetic field excitation. Thereafter, the target torques M_soll_1 and M_soll_2 of the two electric motors 1 and 2 are synchronously increased.

Figure 5:
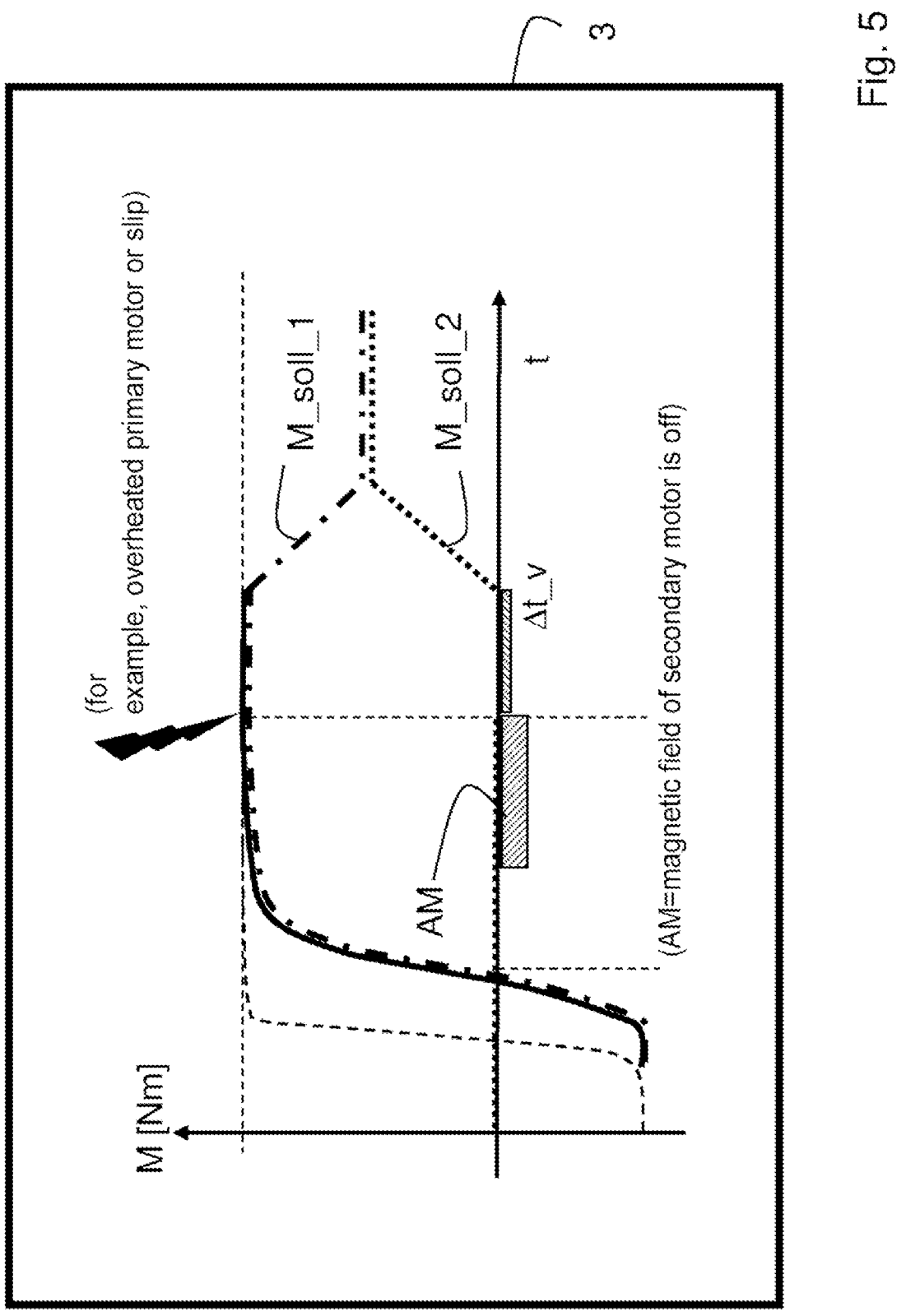
FIG. 5 shows a diagram-type representation of a second solution to the problem represented in FIG. 3, for another area of application.

A further application of the delay of the total target torque M_soll_ges overall by the delay time Δt_v required for the magnetic field excitation can also be carried out when the primary motor 1 is to be assisted by the secondary motor 2 when under an increased load (for example, when overheated or during slip). Finally, this exemplary embodiment is shown in FIG. 5.

The invention claimed is:

1. A control device for operating a roadbound all-wheel drive vehicle having a first electric drive motor assigned to a primary axle and a second electric drive motor assigned to secondary axle, the control device comprising:

at least one electronic control unit configured to:

when a defined dynamic driving mode of the driver is identified on a basis of a driver-input gradient during an operating mode with the first electric drive motor activated and the second electric drive motor deactivated for a predefined time window, ascertain a total target torque curve predefined by a new driver input, wherein the total target torque curve is set in accordance with an axle distribution factor that is likewise predefined, by reducing a target torque of the first electric drive motor and by activating and increasing a target torque of the second electric drive motor, wherein the switching-on of the magnetic field of the second electric drive motor, and thereby the delay time, are started upon detection of at least one of an increased load on the first electric drive motor or a changeover from coasting to traction on a basis of the driver input.

2. The control device according to claim 1, wherein the control unit is configured such that:

when activation of the second electric drive motor is required starting from a switched-off magnetic field of the second electric drive motor, a required magnetization time is predetermined as a predefined delay time, wherein the first electric drive motor solely provides the required total target torque for the duration of the predefined delay time, and wherein after the predefined delay time are the target torques of both the first electric drive motor and the second electric drive motor synchronously set in accordance with the axle distribution factor.

3. The control device according to claim 1, wherein a defined dynamic driving mode of the driver is identified on a basis of the driver-input gradient when the current driver-input gradient exceeds a predefined threshold value.

4. The control device according to claim 1, wherein the predefined total target torque curve is determined depending on the driver-input gradient and depending on a difference between the target torque predefined by the driver input and the currently available torque of the first electric drive motor.

5. An electronic control unit comprising the control device according to claim 1.

6. A non-transitory computer readable medium having stored thereon a computer program that, when executed by a control device for a roadbound all-wheel drive vehicle having a first electric drive motor assigned to a primary axle and a second electric drive motor assigned to secondary axle, cause the control device to:

when a defined dynamic driving mode of the driver is identified on a basis of a driver-input gradient during an operating mode with the first electric drive motor activated and the second electric drive motor deactivated for a predefined time window, ascertain a total target torque curve predefined by a new driver input, wherein the total target torque curve is set in accordance with an axle distribution factor that is likewise predefined, by reducing a target torque of the first electric drive motor and by activating and increasing a target torque of the second electric drive motor, wherein the switching-on of the magnetic field of the second electric drive motor, and thereby the delay time, are started upon detection of at least one of an increased load on the first electric drive motor or a changeover from coasting to traction on a basis of the driver input.

7. The non-transitory computer readable medium according to claim 6, wherein the computer program, when executed by the control device, cause the control device to operate such that:

when activation of the second electric drive motor is required starting from a switched-off magnetic field of the second electric drive motor, a required magnetization time is predetermined as a predefined delay time, wherein the first electric drive motor solely provides the required total target torque for the duration of the predefined delay time, and wherein after the predefined delay time are the target torques of both the first electric drive motor and the second electric drive motor synchronously set in accordance with the axle distribution factor.

8. The non-transitory computer readable medium according to claim 6, wherein the computer program, when executed by the control device, cause the control device to operate such that:

a defined dynamic driving mode of the driver is identified on a basis of the driver-input gradient when the current driver-input gradient exceeds a predefined threshold value.

9. The non-transitory computer readable medium according to claim 6, wherein the computer program, when executed by the control device, cause the control device to operate such that:

the predefined total target torque curve is determined depending on the driver-input gradient and depending on a difference between the target torque predefined by the driver input and the currently available torque of the first electric drive motor.

10. A control device for operating a roadbound all-wheel drive vehicle having a first electric drive motor assigned to a primary axle and a second electric drive motor assigned to secondary axle, the control device comprising:

at least one electronic control unit configured to:

when a defined dynamic driving mode of the driver is identified on a basis of a driver-input gradient during an operating mode with the first electric drive motor activated and the second electric drive motor deactivated for a predefined time window, ascertain a total target torque curve predefined by a new driver input, wherein the total target torque curve is set in accordance with an axle distribution factor that is likewise predefined, by reducing a target torque of the first electric drive motor and by activating and increasing a target torque of the second electric drive motor, wherein a defined dynamic driving mode of the driver is identified on a basis of the driver-input gradient when the current driver-input gradient exceeds a predefined threshold value.

11. The control device according to claim 10, wherein the control unit is configured such that:

when activation of the second electric drive motor is required starting from a switched-off magnetic field of the second electric drive motor, a required magnetization time is predetermined as a predefined delay time, wherein the first electric drive motor solely provides the required total target torque for the duration of the predefined delay time, and wherein after the predefined delay time are the target torques of both the first electric drive motor and the second electric drive motor synchronously set in accordance with the axle distribution factor.

12. The control device according to claim 10, wherein the predefined total target torque curve is determined depending on the driver-input gradient and depending on a difference between the target torque predefined by the driver input and the currently available torque of the first electric drive motor.

* * * * *